Aug. 20, 1957  N. A. SCHUSTER  2,803,796
ELECTRICAL APPARATUS FOR WELL LOGGING
Filed May 21, 1953

INVENTOR.
NICK A. SCHUSTER
BY
*Campbell, Brumbaugh, Free + Graves*
HIS ATTORNEYS.

United States Patent Office 2,803,796
Patented Aug. 20, 1957

2,803,796

ELECTRICAL APPARATUS FOR WELL LOGGING

Nick A. Schuster, Ridgefield, Conn., assignor, by mesne assignments, to Schlumberger Well Surveying Corporation, Houston, Tex., a corporation of Texas Application May 21, 1953, Serial No. 356,467

14 Claims. (Cl. 324—1)

The present invention relates to the electrical investigation of earth formations traversed by a bore hole and more particularly to new and improved methods and apparatus for controlling the potential and current distribution in the earth formations adjacent to an electrical logging array passing through the bore hole.

It has become accepted practice to obtain electrical resistivity logs of the earth formations traversed by a bore hole by automatically controlling the potential and current distribution in the vicinity of an electrical logging array passing through said bore hole, whereby the resistivity or conductivity indications are more nearly representative of the actual resistivity or conductivity sought to be measured. Exemplary types of such systems are disclosed in the copending applications Serial No. 214,273, filed March 7, 1951 (now Patent No. 2,712,629), for "Electrical Logging of Earth Formations Traversed by a Bore Hole," and Serial No. 161,641, filed May 12, 1950 (now Patent No. 2,712,627), for "Electrical Resistivity Well Logging Method and Apparatus," by H. G. Doll. In these systems, a constant logging current emitted by a principal electrode in the bore hole is confined to a path substantially perpendicular to the bore hole axis by auxiliary currents from nearby electrodes on opposite sides of the principal electrode. The auxiliary currents are supplied by feedback amplifier means responsive to potential differences between pairs of spaced apart points lying on opposite sides of the principal current electrode and they act to reduce those potential differences substantially to zero.

It is an object of the invention to provide novel and improved well logging methods and apparatus of the above character in which the demands made on the amplifying means under extreme bore hole conditions are not as severe as they sometimes were in the previous practice.

Another object of the invention is to provide novel and improved apparatus of the above character, which is capable of providing direct indications of the electrical conductivity of the earth formations.

In accordance with the present invention, the auxiliary current supplied by auxiliary electrode means is controlled to maintain substantially constant an electrical value which is a function of that current and the current for the principal electrode is supplied by feedback means which is responsive to the potential difference between at least one pair of potential pickup points and which acts to maintain that potential difference substantially at zero. Under these conditions, indications are obtained of an electrical value representative of an electrical property of the formations in the vicinity of the principal electrode.

In one embodiment of the invention, the current emitted by the auxiliary electrode means is controlled to maintain a substantially constant potential difference between a reference point and one of the potential pickup points and indications are obtained of variations in the current emitted by the principal current electrode as a measure of the electrical conductivity of the formations.

According to another embodiment of the invention, the current emitted by the auxiliary electrode means is controlled in response to the principal electrode current so as to maintain the latter substantially constant, and indications are obtained of the potential difference between a reference point and one of the potential pickup points as a measure of the electrical resistivity of the earth formations.

The invention will be more fully understood with reference to the following detailed description taken in conjunction with the accompanying drawings, in which.

Figure 1:
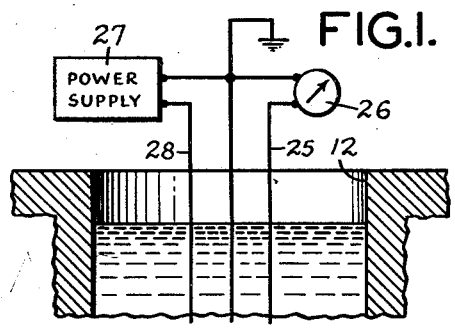
Fig. 1 is an electrical schematic diagram of one exemplary embodiment of the present invention.
Figure 1A:
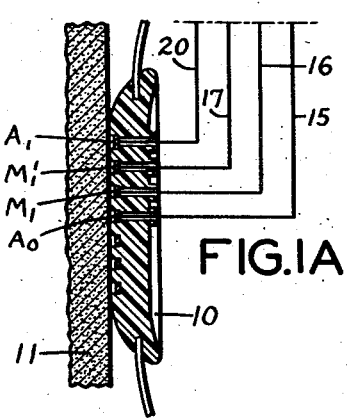
Fig. 1A is a cross-sectional view of the electrode array shown schematically in Fig. 1.

In Fig. 1, the invention is illustrated in connection with an electrical logging array similar to those described in the aforementioned copending application Serial No. 214,273. Thus, the electrode array comprises a central, principal current electrode $A_0$, a pair of concentric potential pickup electrodes $M_1$, $M_1'$ and a concentric auxiliary current electrode $A_1$. As shown in Fig. 1A, the electrodes $A_0$, $M_1$, $M_1'$ and $A_1$ may be placed in recesses in a non-conductive pad 10 adapted to have its wall engaging face maintained against the bore hole wall 11 of the bore hole 12 by conventional means as the electrode array is moved through the bore hole. The principal current electrode $A_0$ is adapted to receive current from the output of an amplifier 13, one output terminal of which is connected to a remote ground point 15a and the other output terminal of which is connected to the electrode $A_0$ through a small resistor 14 and an insulated conductor 15. The amplifier 13 responds to difference in potential between the electrodes $M_1$ and $M_1'$ which is supplied to its input terminals by the insulated conductors 16 and 17, and it is arranged for negative feedback so that the potential difference between the electrodes $M_1$ and $M_1'$ is maintained at substantially zero.

An oscillator or alternating current generator 18 supplies an auxiliary current to the electrode $A_1$ through a variable gain amplifier 19, one terminal of which is connected to ground at a relatively remote point 20a and the other terminal of which is connected to the electrode $A_1$ by an insulated conductor 20. The amplitude of the auxiliary current applied to the electrode $A_1$ is automatically controlled to maintain the potential in the vicinity of the electrodes $M_1$ and $M_1'$, relative to a remote point, at a predetermined constant value. To this end, one of the potential pickup electrodes, e. g., the electrode $M_1'$ may be connected by means of a conductor 21 to one input terminal of a detector 22, which is biased by a voltage of said predetermined value, the other terminal of which is grounded at a remote point 21a. The detector 22 may be adapted to provide a D. C. signal varying as a function of the potential difference between the electrode $M_1'$ and the ground 21a, which signal is fed to conventional gain control means in the amplifier 19. Thus, the output of the detector 22 controls the amplitude of the auxiliary current applied to the electrode $T_1$, whereby the potential in the vicinity of the electrodes $M_1$ and $M_1'$ with respect to the ground 21a is continuously maintained at the predetermined level as the logging array is moved through the bore hole.

With the circuit of Fig. 1 connected and adjusted as described above, it can be shown that the logging current passing between the electrode $A_0$ and the remote point 15a will be proportional to the electrical conductivity of the material in a predetermined path through the earth formations, to substantially the same extent that the potential indications obtained in accordance with the method disclosed in the aforementioned application Serial No. 214,273 are proportional to the resistivity of the material. Indications of the amplitude of the logging current emitted by the principal electrode $A_0$ may be measured by obtaining continuous indications of the voltage drop across the resistor 14. To this end, the voltage across the resistor 14 may be fed to a conventional detector 24. One output terminal of the detector 24 may be grounded and the other output terminal may be connected to an insulated cable conductor 25 connected to one terminal of suitable indicating means 26 at the earth's surface, the other terminal of which is connected to ground. The indicating means 26 is preferably of a type capable of recording the formation conductivity as a function of the depth of the electrode array in the bore hole 12. The electrical power necessary to operate the electronic equipment, which is preferably disposed in the bore hole with the electrode array, may be supplied from the surface of the earth by a suitable power supply 27 through an insulated cable conductor 28, the energizing circuit being completed through ground.

Thus, the present invention enables accurate measurements of the formation conductivity to be obtained directly. Further, the conductivity measurement may be recorded directly as a function of the porosity of the formations opposite the electrode $A_0$ by providing the recording means 26 with a nonlinear scale proportional to the square root of the conductivity measurement obtained.

An important advantage of the system shown in Fig. 1 is that the amplifier 13 is not required to supply as wide a range of output currents in order to accommodate extreme bore hole conditions, and thus may be considerably less complex than those previously employed in similar apparatus.

Figure 2:
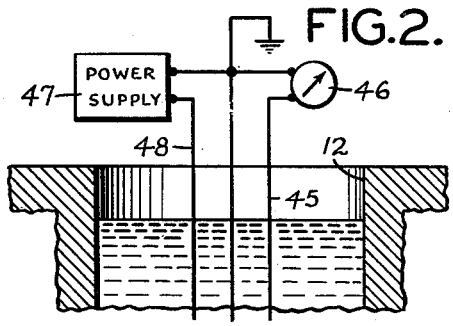
Fig. 2 is an electrical schematic diagram of a second exemplary embodiment, according to the invention.

If it is desired to obtain indications of formation electrical resistivity directly, the apparatus shown in Fig. 2 may be employed. For purposes of illustration, the embodiment shown in Fig. 2 will be described in conjunction with an electrode array of the type disclosed in the aforementioned copending application Serial No. 161,641 of H. G. Doll. The electrode array 30 includes a central, principal current electrode $A_0$ having symmetrically disposed on opposite sides thereof a plurality of pairs of electrodes $M_1$ and $M_2$, $M_1'$ and $M_2'$, and $A_1$ and $A_2$. As shown, the electrodes in each pair are electrically connected together and the spacings between the respective pairs are different.

As in the emobdiment of Fig. 1, the principal current electrode $A_0$ receives current from a feedback amplifier 33 responsive to any potential difference between the electrodes $M_1$, $M_1'$, or $M_2$, $M_2'$. Thus, one output terminal of the amplifier 33 is grounded at a remote point 35a while the other output terminal is connected through a resistor 34 and the conductor 35 to the electrode $A_0$. The average potential difference between the electrodes $M_1$, $M_2$ and $M_1'$, $M_2'$ is supplied by means of the conductors 36 and 37 to the input terminals of the amplifier 33. The system is adjusted for negative feedback so that the potential difference between the electrodes $M_1$, $M_2$ as a unit and the electrodes $M_1'$, $M_2'$ as a unit is maintained substantially at zero.

Also, the auxiliary current electrodes $A_1$ and $A_2$ are supplied with alternating current from a suitable source 38 through an adjustable gain amplifier 39, one output terminal of the latter being grounded at a relatively remote point 40a and its other output terminal being connected to the electrodes $A_1$ and $A_2$ by the conductor 40. However, the gain of the amplifier 33 is adjusted in response to the current emitted by the principal electrode $A_0$ so as to maintain the latter constant. To this end, a voltage proportional to the current passing through the electrode $A_0$ is obtained across the resistor 34 and applied to the input terminals of a biased detector device 42. The detector device 42 is biased with a potential corresponding to the desired current passing through the resistor 34 and the electrode $A_0$ and it provides a D. C. output through the conductors 43 to conventional gain control means in the amplifier 39, so that the auxiliary current emitted by the electrodes $A_1$ and $A_2$ will be varied to maintain the current emitted by the electrode $A_0$ substantially constant.

The potential in the vicinity of the electrodes $M_1$, $M_2$, $M_1'$, $M_2'$ relative to a remote point, may be measured by means of a recording galvanometer 46 having a grounded terminal and another terminal connected by the conductors 45 and 36 to the electrodes $M_1$ and $M_2$, for example. A power supply 47 at the surface may supply the necessary electrical energy to operate the equipment, which is preferably disposed in the bore hole, through an insulated cable conductor 48, as shown.

The invention thus provides novel methods and apparatus for obtaining accurate indications of the electrical conductivity or resistivity of earth formations traversed by a bore hole. By virtue of the novel features outlined in the foregoing description, logs of good accuracy may be obtained without placing severe demands on the feedback means employed in the system.

While the embodiments disclosed in Figs. 1 and 2 have been described in connection with particular electrode arrays, it will be understood that either of these embodiments may be employed with any of the electrode arrays disclosed in the aforementioned applications Serial Nos. 214,273 and 161,641. Further, the invention has general application in many other electrical logging systems utilizing automatic potential and current control, such as, for example, those disclosed in the copending applications Serial No. 211,788, filed February 19, 1951 (now Patent No. 2,712,628), for "Electrical Logging Apparatus," by H. G. Doll; Serial No. 257,348, filed November 20, 1951 (now Patent No. 2,712,630), for "Methods and Apparatus for Electrical Logging of Wells," by H. G. Doll; and application Serial No. 282,579, filed April 16, 1952 (now Patent No. 2,712,631), for "Electrical Well Logging," by M. C. Ferre.

Further, although symmetrical electrode arrays of the type shown in Figs. 1 and 2 are preferred, unsymmetrical arrays may be used. For example, an array including only the electrodes $A_0$, $M_1$, $M_1'$ and $A_1$ of Fig. 2 would have utility in obtaining indications of formation resistivity close to the bottom of a bore hole.

It will be understood, further, that the particular automatic potential and current control means disclosed are merely exemplary, and that they are susceptible of variation and modification without departing from the spirit and scope of the invention as defined in the appended claims.

I claim:

1. In apparatus for investigating earth formation traversed by a bore hole, the combination of an electrode array mounted for movement through a bore hole and including a central electrode and first, second, and third electrode means each including portions spaced apart in opposite directions from, and symmetrically disposed about a bore hole radius through said central electrode, insulated means for electrically connecting the portions of each said electrode means, the distances between the spaced apart portions of the respective electrode means being different, first feedback means supplying a first current to the spaced apart portions of said third electrode means and to a reference point at ground potential and responsive to a first potential difference between a reference point at ground potential and the spaced apart portions of one of said first and second electrode means for maintaining said first potential difference substantially constant, second feedback means responsive to a second potential difference between said first and second electrode means for supplying a second current to said central electrode and to a reference point at ground potential to reduce said second potential difference substantially to zero, and means providing indications of the current emitted by said central electrode as representative of an electrical property of the formations in the vicinity of said central electrode.

2. In apparatus for investigating earth formation traversed by a bore hole, the combination of an electrode array mounted for movement through a bore hole and including a central electrode and first, second, and third electrode means each including portions spaced apart longitudinally of the bore hole in opposite directions from, and symmetrically disposed about a bore hole radius through said central electrode, insulated means for electrically connecting the portions of each said electrode means, the distances between the spaced apart portions of the respective electrode means being different, first feedback means responsive to a first potential difference between one of said first and second electrode means and a reference point at ground potential for supplying current to the spaced apart portions of said third electrode means and to a reference point at ground potential to maintain said first potential difference substantially at a referance value, second feedback means responsive to a second potential difference between said first and second electrode means for supplying a second current to said central electrode and to a reference point ground potential to maintain said last-named potential difference substantially at zero, and means for providing indications of variations in said second current.

3. In a method for investigating earth formations traversed by a bore hole, the steps of establishing in the earth formations between first and second spaced apart locations on the bore hole wall a first electric current field having a component in one direction determined by a line through said locations, establishing in the earth formations between said first and second bore hole wall locations a second electric current field having a component opposite in direction to said component of said first electric field, adjusting the amplitude of said second electric field so as to maintain substantially zero potential difference between said first and second bore hole wall locations, adjusting the amplitude of said first electric current field so as to maintain substantially constant one of two quantities including (1) the potential difference between a point in the vicinity of one of said locations and a reference point at ground potential and (2) the amplitude of said second electric current field, and obtaining indications of a function of the other of said two quantities.

4. In a method for investigating earth formations traversed by a bore hole, the steps of disposing an electrode in the bore hole, passing a first current through the surrounding formations between said electrode and a reference point, said current having first and second bore hole components extending upwardly and downwardly, respectively, from said electrode, passing a second current between a first location near and above said electrode and a remote reference point, said second current having a bore hole component extending downwardly from said first location and cooperating with the upwardly directed component of said first current to influence the potentials at a first pair of longitudinally spaced apart points lying between said electrode and said first location, passing a third current between a second location near and below said electrode and a reference point, said third current having a bore hole component directed upwardly from said second location and cooperating with the downwardly directed component of said first current to influence the potentials at a second pair of longitudinally spaced apart points lying between said electrode and said second location, controlling said first current as a function of the potential differences between said pairs of points to maintain said potential differences substantially zero, controlling said second and third currents to maintain substantially constant one of two quantities including (1) the potential difference between at least one point among said pairs of points and a remote point at ground potential, and (2) said first current, and obtaining indications of a function of the other of said quantities.

5. In a method for investigating earth formations traversed by a bore hole, the steps of establishing a first electric current field in the earth formations between a first loop-shaped bore hole wall zone and a reference point at ground potential, establishing a second electric current field in the earth formations between a reference point at ground potential and a central bore hole wall zone concentric with said first loop-shaped zone, adjusting the amplitude of said first electric current field so as to maintain a substantially constant potential difference between a reference point at ground potential and a second loop-shaped bore hole wall zone intermediate said central zone and said first loop-shaped zone, adjusting the amplitude of said second electric current field so as to maintain substantially zero potential difference between said second loop-shaped bore hole wall zone and a third loop-shaped bore hole wall zone spaced apart from said second zone and lying intermediate said central zone and said first loop-shaped zone, and obtaining indications of a function of the amplitude of said second electric current field.

6. In a method for investigating earth formations traversed by a bore hole containing a column of conductive bore hole liquid, the steps of establishing a first electric current field in the earth formations between first and second locations longitudinally spaced apart along the bore hole, and a reference point at ground potential, establishing a second electric current field in the earth formations between a reference point at ground potential and a third location intermediate said first and second locations, adjusting the amplitude of said first electric current field so as to maintain a substantially constant potential difference between a reference point at ground potential and at least a fourth location intermediate said third location and at least one of said first and second locations, adjusting the amplitude of said second electric current field so as to maintain substantially zero potential difference between said fourth location and a fifth location spaced apart therefrom longitudinally on the bore hole and lying intermediate said third location and said one of said first and second locations, and obtaining indications of a function of the magnitude of said second electric field.

7. In apparatus for investigating earth formations traversed by a bore hole, the combination of energized electrical means for establishing a first electric current field in the earth formations between a reference point at ground potential and first and second electrode means spaced apart along the bore hole and adapted to be lowered thereinto, an electrode interposed between said first and second electrode means and movable therewith, electric source means responsive to a first potential difference between at least two points spaced apart along the bore hole and lying between said electrode and said electrode means for supplying current to said electrode and to a reference point at ground potential to maintain substantially zero potential difference between said two points, means responsive to one of two quantities including (1) a second potential difference between one of said two points and a reference point at ground potential and (2) the amplitude of the current supplied to said electrode, for controlling said first field establishing means to maintain said quantity substantially constant, and means for providing indications of a function of the other of said two quantities.

8. In apparatus for investigating earth formations traversed by a bore hole, the combination of an electrode adapted to be lowered into a well, electric source means responsive to potential difference between two nearby longitudinally spaced apart points in the vicinity of said electrode for supplying current to said electrode and to a relatively remote reference point to establish an electric field distribution in the bore hole and earth formations surrounding said electrode to bring said potential difference substantially to zero, said electric field distribution having a bore hole component extending in one direction along the bore hole, energized electrical means for establishing another electric field distribution near said electrode and in the vicinity of said spaced apart points, said another electric field distribution having a bore hole component directed in opposition to the bore hole component of said first mentioned electric field distribution, means for controlling said electrical means to maintain substantially constant one of two quantities including (1) the current emitted by said electrode and (2) the potential difference between one of said two spaced part points and a reference point at ground potential, and means for obtaining indications of a function of the other of said two quantities.

9. In apparatus for investigating earth formations traversed by a bore hole, the combination of an electrode array mounted for movement through the bore hole, said array comprising a central electrode surrounded by first, second and third loop-shaped electrodes of different sizes increasing with the distance from said central electrode, said electrodes being mounted to face the bore hole side wall, means urging said electrodes against the bore hole side wall and including means insulating said electrodes from direct electrical communication with any conductive liquid in the bore hole, first electric source means responsive to a first potential difference between a reference point at ground potential and one of said first and second loop-shaped electrodes for passing current between said third loop-shaped electrode and a reference point at ground potential to maintain said potential difference constant, second electric source means responsive to a second potential difference between said first and second loop-shaped electrodes for passing current between said central electrode and a reference point at ground potential to maintain said second potential difference substantially zero, and means for providing indications of the current emitted by said central electrode.

10. In a method for investigating earth formations traversed by a bore hole, the steps of establishing in the bore hole and surrounding formations in the vicinity of two longitudinally spaced apart points in the bore hole a first electric field having a component directed along the bore hole axis, establishing in the bore hole and surrounding formations in the vicinity of said two points a second electric field having a component along the bore hole axis opposite in direction to the bore hole axis component of said first field, controlling said second electric field in accordance with the potential difference between said two points to maintain said potential difference substantially zero, controlling said first electric field to maintain said second electric field substantially constant, and obtaining indications of the potential difference between one of said two points and a remote reference point as a measure of the electrical resistivity of the surrounding formations.

11. In a method for investigating earth formations travesed by a bore hole, the steps of disposing an electrode in the bore hole, passing a first current through the surrounding formations between said electrode and a reference point, said current having first and second bore hole components extending upwardly and downwardly, respectively, from said electrode, passing a second current between a first location near and above said electrode and a remote reference point, said second current having a bore hole component extending downwardly from said first location and cooperating with the upwardly directed component of said first current to influence the potentials at a first pair of longitudinally spaced apart points lying between said electrode and said first location, passing a third current between a second location near and below said electrode and a reference point, said third current having a bore hole component directed upwardly from said second location and cooperating with the downwardly directing component of said first current to influence the potentials at a second pair of longitudinally spaced apart points lying between said electrode and said second location, controlling said first current as a function of the potential differences between said pairs of points to maintain said potential differences substantially zero, controlling said second and third currents to maintain said first current substantially constant, and obtaining indications of the potential difference between at least one point among said pairs of points and a remote reference point as a measure of the electrical resistivity of the earth formation in the vicinity of said electrode.

12. In apparatus for investigating earth formations traversed by a bore hole, the combination of an electrode adapted to be lowered into a well, electric source means responsive to potential difference between two nearby longitudinally spaced apart points in the vicinity of said electrode for supplying current to said electrode and to a relatively remote reference point to establish an electric field distribution in the bore hole and earth formations surrounding said electrode, said electric field distribution having a bore hole component extending in one direction along the bore hole, energized electrical means for establishing another electric field distribution near said electrode and in the vicinity of said spaced apart points, said another electric field distribution having a bore hole component directed in opposition to the bore hole component of said first mentioned electric field distribution, means for controlling said electrical means to maintain substantially constant the current emitted by said electrode, and means for providing indications of potential difference between one of said points and a relatively remote reference point.

13. In apparatus for investigating earth formations traversed by a bore hole, the combination of an electrode array mounted for movement through a bore hole and including a plurality of longitudinally spaced apart electrode means in insulated relation relative to each other, electric source means responsive to the potential difference between first and second ones of said plurality of spaced apart electrode means for supplying current to a third one of said plurality of spaced apart electrode means located in the vicinity of said first and second electrode means and to a relatively remote reference point to establish an electric field distribution in the bore hole and earth formations surrounding said electrode array, said field distribution having a bore hole component extending in one direction along the bore hole, energized electrical means connected to a fourth one of said plurality of spaced apart electrode means and to a remote reference point for establishing another electric field distribution near said third electrode means and in the vicinity of said first and second electrode means, said another electric field distribution having a bore hole component directed in opposition to the bore hole component of said first mentioned electric field distribution, means for controlling said electrical means to maintain substantially constant the current emitted by said third electrode means, and means for providing indications of potential difference between one of said first and second electrode means and a relatively remote reference point.

14. In apparatus for investigating earth formations traversed by a bore hole, the combination of an electrode array mounted for movement through a bore hole and including a central electrode and first, second, and third electrode means including spaced apart portions symmetrically disposed above and below said central electrode, insulated means for electrically connecting the portions of each said electrode means, the distances between the spaced apart portions of the respective electrode means being different, first feedback means responsive to potential difference between said first and second electrode means for supplying a first current to said central electrode and to a remote reference point to reduce said potential difference substantially to zero, second feedback means responsive to said first current for supplying a second current to the spaced apart portions of said third electrode means and to a remote point to maintain said first current substantially constant, and means providing indications of potential difference between one of said first and second electrode means and a remote reference point.

References Cited in the file of this patent

UNITED STATES PATENTS

| | | |
|---|---|---|
| 2,712,628 | Doll | July 5, 1955 |
| 2,712,629 | Doll | July 5, 1955 |
| 2,712,630 | Doll | July 5, 1955 |
| 2,729,784 | Fearon | Jan. 3, 1956 |